(12) United States Patent
Koyama et al.

(10) Patent No.: US 6,637,550 B2
(45) Date of Patent: Oct. 28, 2003

(54) DISPLACEMENT TYPE FLUID MACHINE

(75) Inventors: Masaki Koyama, Chiyoda (JP); Isamu Tsubono, Ushiku (JP); Isao Hayase, Tsuchiura (JP); Yuugo Mukai, Oohira (JP); Koichi Sekiguchi, Oohira (JP); Kenichi Oshima, Iwafune (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/855,675

(22) Filed: May 16, 2001

(65) Prior Publication Data

US 2002/0033305 A1 Mar. 21, 2002

(30) Foreign Application Priority Data

Sep. 20, 2000 (JP) ........................................ 2000-285178

(51) Int. Cl.⁷ ................................................. F01M 1/04
(52) U.S. Cl. ..................................................... 184/6.16
(58) Field of Search ................................. 184/6.16–6.18

(56) References Cited

U.S. PATENT DOCUMENTS

| | | | | |
|---|---|---|---|---|
| 4,623,306 A | * | 11/1986 | Nakamura et al. | ......... 184/6.18 |
| 4,626,180 A | * | 12/1986 | Tagawa et al. | ............ 184/6.16 |
| 4,710,111 A | * | 12/1987 | Kubo | ......................... 184/6.16 |
| 5,593,297 A | * | 1/1997 | Nakajima et al. | .......... 184/6.16 |
| 5,660,539 A | * | 8/1997 | Matsunaga et al. | ........ 184/6.18 |

* cited by examiner

*Primary Examiner*—Chong H. Kim
(74) *Attorney, Agent, or Firm*—Antonelli, Terry, Stout & Kraus, LLP

(57) ABSTRACT

A displacement type fluid machine has a first lubricating fluid pump, provided at the rotating shaft and immersed in the lubricating fluid stored in the lubricating fluid-storing chamber, for feeding lubricating fluid to a first one of the two sliding portions via a lubricating fluid-guiding path formed at the rotating shaft; a second lubricating fluid pump, provided at the rotating shaft, for raising the pressure of lubricating fluid which has been fed via the lubricating fluid-guiding path by a predetermined pump head, and for feeding that lubricating fluid to a second one of the two sliding portions; and a third lubricating fluid pump, which is provided at or near the rotating shaft, for raising the pressure of lubricating fluid which has been fed via the lubricating fluid-guiding path by a predetermined pump head, and for feeding that lubricating fluid to a third one of the two sliding portions.

18 Claims, 4 Drawing Sheets

DISPLACEMENT TYPE FLUID MACHINE

BACKGROUND OF THE INVENTION

The present invention relates to a displacement type fluid machine, which is used for a cooling medium compressor of the type used in a refrigerator, a freezer, an air conditioner, etc., a gas compressor, such as an air compressor, a vacuum pump, a helium compressor, etc., an expander, a fluid pump, and so forth.

Conventional techniques in the application of a displacement type fluid machine will be explained with reference to a scroll compressor, as an example. In a scroll compressor as disclosed in Japanese Patent Application Laid-Open Hei 6-81792, oil is fed to sliding portions, such as bearings, by a pump including a spiral groove provided near an oil tank situated in the compressor. Further, in scroll compressors disclosed in Japanese Patent Applications Laid-Open Hei 8-303364 and Hei 9-32760, oil is fed to sliding portions by a displacement type pump and a centrifugal pump, respectively, using centrifugal force generated by rotation of a shaft.

In all of the above conventional techniques, oil is fed to sliding portions, such as bearings, by one oil-feed pump provided near an oil-storing chamber. Accordingly, it is necessary to determine the capacity of that oil-feed pump so that the oil-feed pump is capable of feeding oil in an amount which satisfies the needs of a plurality of bearings situated in a fluid machine; however, this frequently results in the need for an oil-feed pump having an excessive oil-feed capacity. Thus, there has been a problem in that the oil-feeding becomes excessive during high-speed operation of the compressor, and so the performance of the compressor is degraded by an increase in the power consumed to compress the excess oil.

Further, since the oil-feed pump itself can cause a large power loss, the oil-feed pump increases the total mechanical power loss, and this has been a cause of the degrading of the performance of the compressor.

SUMMARY OF THE INVENTION

The present invention has been achieved in order to solve the above problems, and it is an object of this invention to provide a displacement type fluid machine which is capable of reducing mechanical power loss by preventing excessive oil-feeding during high speed operation of the fluid machine.

To achieve the above object, the present invention provides a displacement type fluid machine, wherein a lubricating fluid pump for transferring lubricating oil to lubricate each bearing is provided at each sliding portion by forming a pump at or near each bearing for rotatably supporting a shaft of the fluid machine, the lubricating fluid pump being a non-displacement type pump.

By the above composition of the bearings and the pumps, lubricating oil can be fed to each bearing by the pump provided at that bearing in a quantity necessary for lubricating each bearing. Therefore, each pump has only to provide a capacity such that the pump head to the next pump can be ensured. Thus, while nearly ideal bearing oil-feeding characteristics can be implemented, the power loss of each pump can be greatly reduced.

Meanwhile, there are two types of pumps, that is, a displacement type pump which transfers fluid by compartmentalizing the fluid into respective volumes and pressurizing the compartmentalized fluid, and a non-displacement type pump, such as a centrifugal pump, a viscous pump, etc., which continuously transfers fluid without compartmentalizing the fluid into respective volumes.

DETAILED DESCRIPTION OF THE EMBODIMENTS

Figure 1:
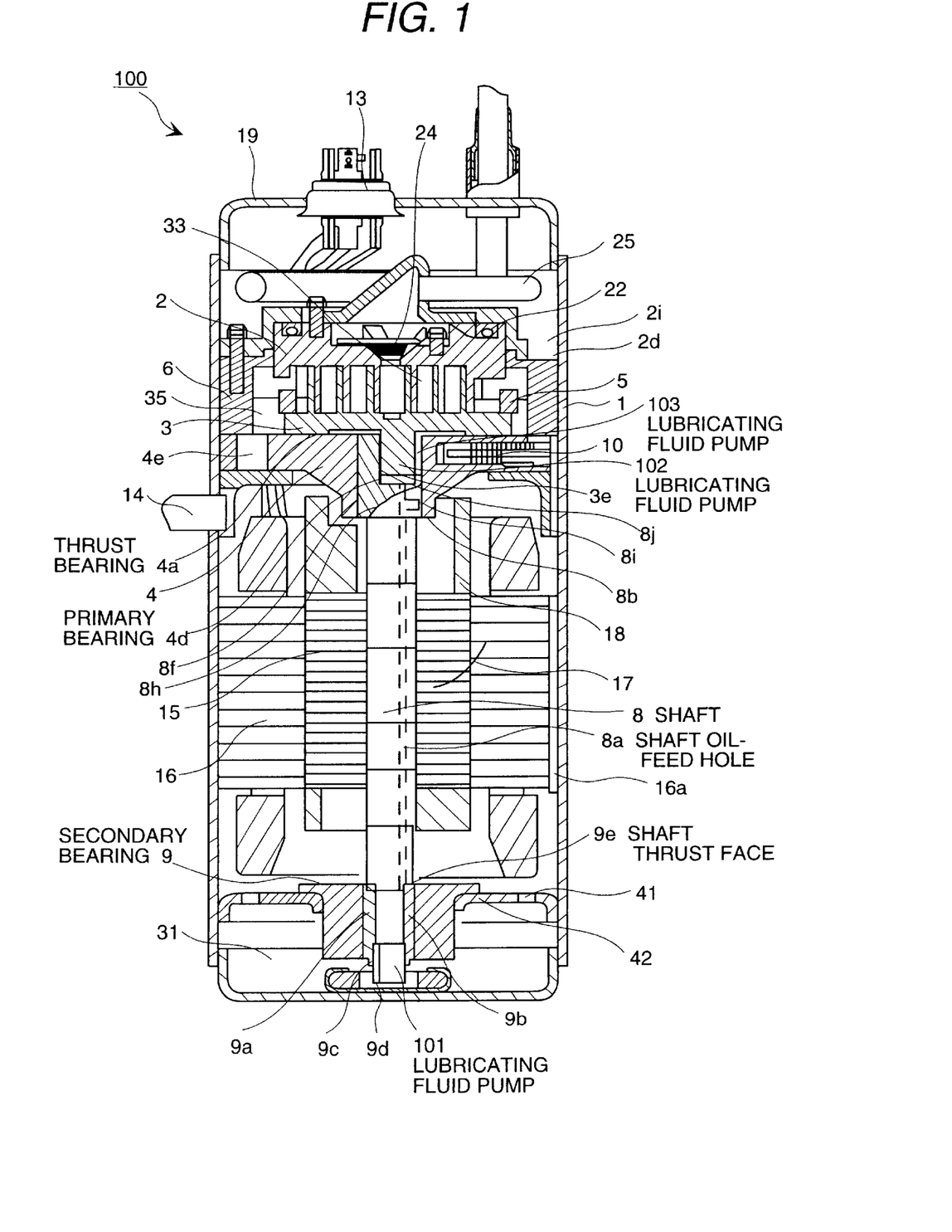
FIG. 1 is a vertical cross sectional view showing the composition of a scroll compressor representing an embodiment according to the present invention.
Figure 2:
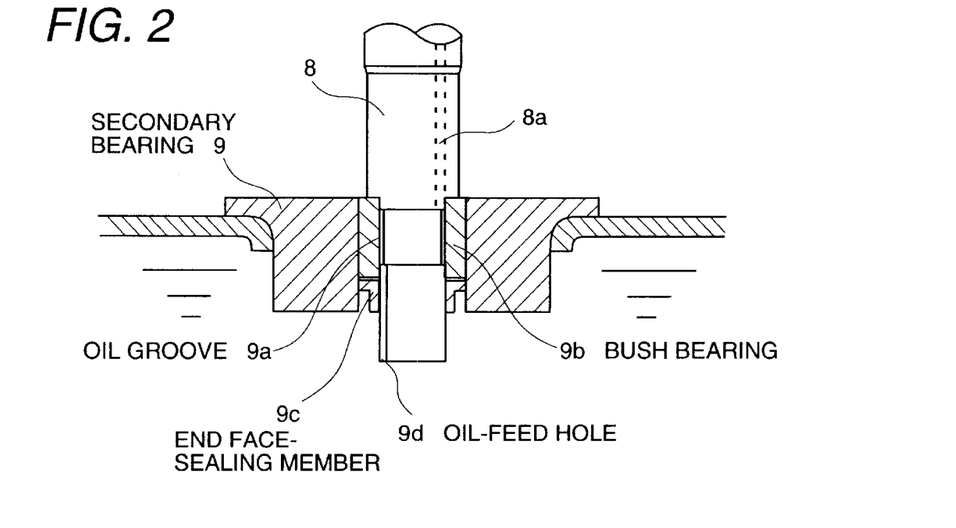
FIG. 2 is a vertical cross sectional view showing the composition of a secondary bearing portion of the scroll compressor shown in FIG. 1.
Figure 3:
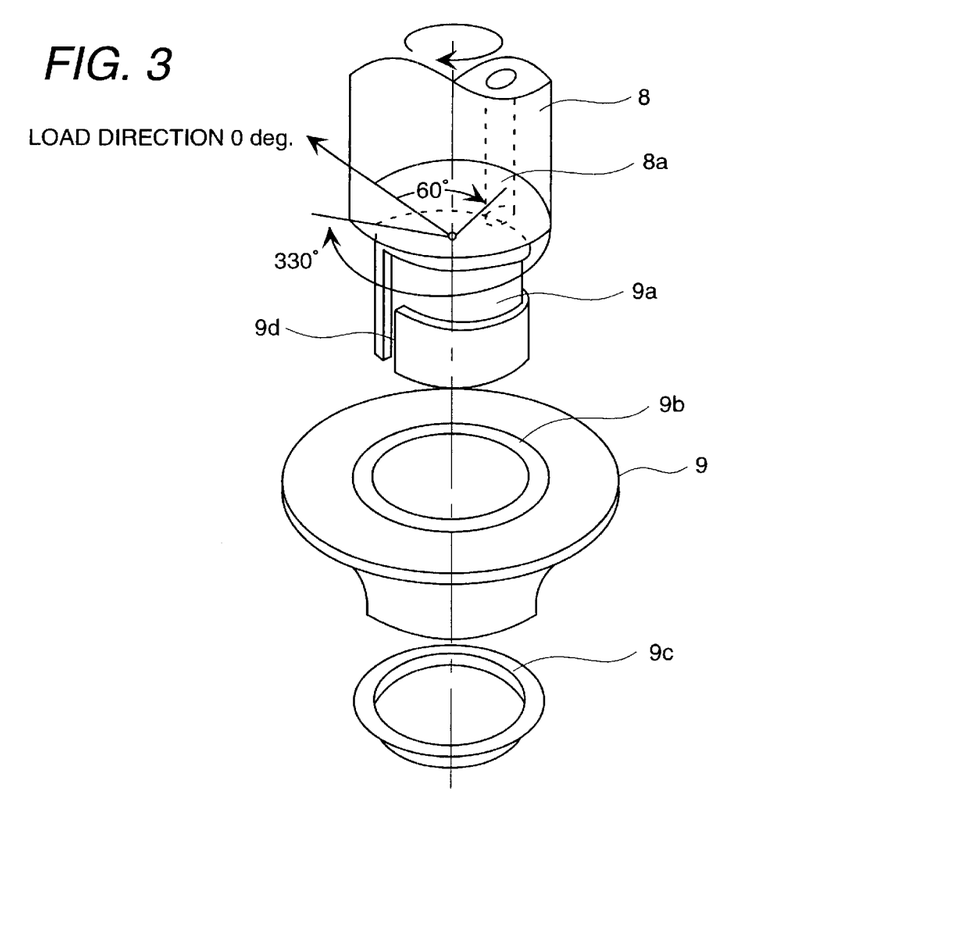
FIG. 3 is an exploded perspective view of the secondary bearing portion shown in FIG. 1.
Figure 4:
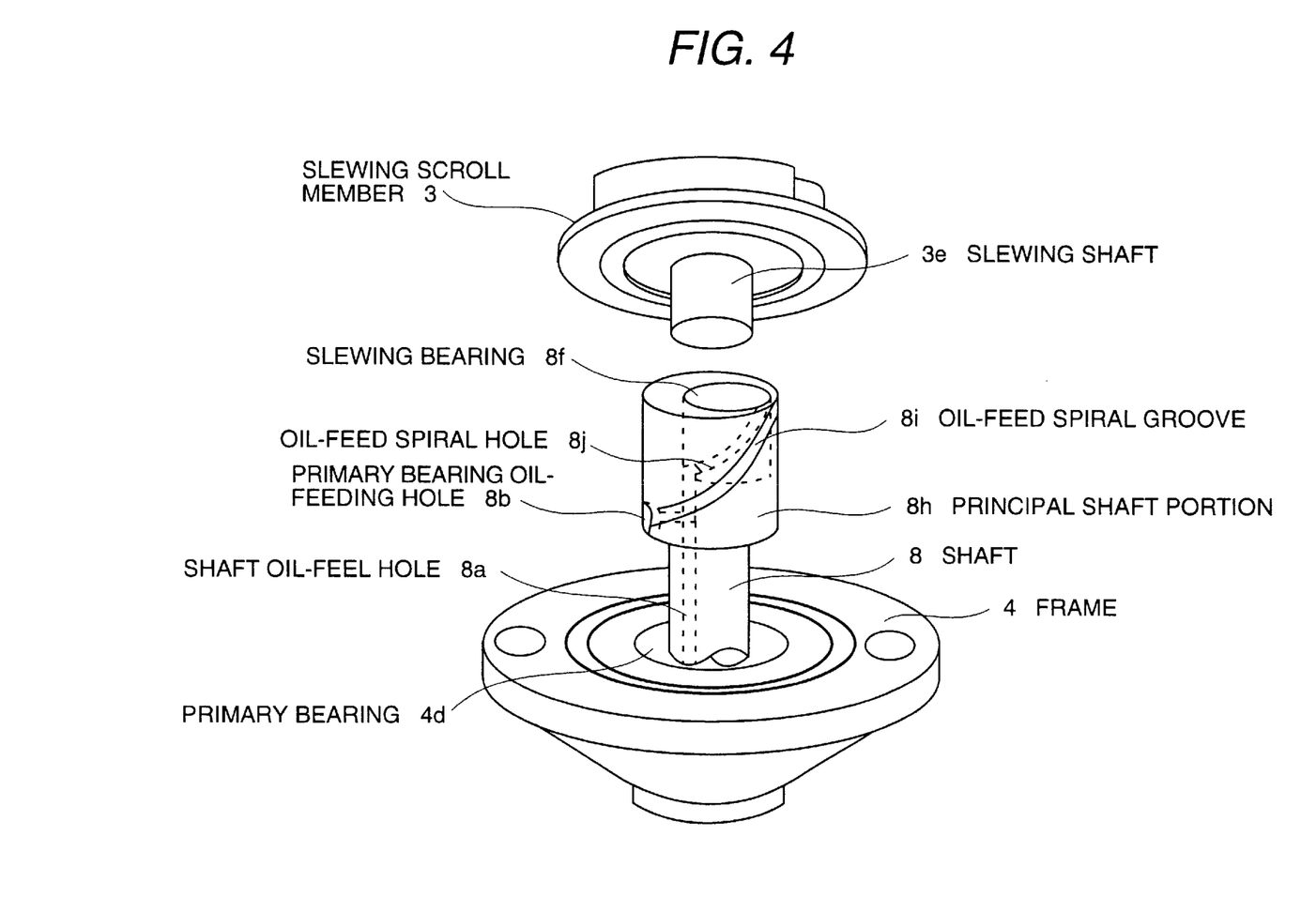
FIG. 4 is an exploded perspective view of a primary bearing portion of the scroll pump and a slewing bearing portion shown in FIG. 1.

In the following description, a first embodiment will be explained with reference to FIG. 1–FIG. 4. In this embodiment, the displacement type fluid machine according to the present invention is a low pressure type scroll compressor, in which the pressure in its case is suction pressure and the diameter of the container 1 is 5 mm–1000 mm. FIG. 1 shows a vertical cross section of the compressor, and FIG. 2 shows a vertical cross section of a secondary bearing. Further, FIG. 3 shows an exploded perspective view of a secondary bearing portion, and FIG. 4 shows an exploded perspective view of a primary bearing portion and a slewing bearing portion.

As seem in these figures, the compressor includes a closed container 1, a non-slewing scroll member 2 located at the upper portion of the closed container 1, and a slewing scroll member (orbiting scroll member) 3, which is situated under the non-slewing scroll member 2 and which engages with the non-slewing scroll member 2 to form a compressing chamber 33. Also, there is an oil chamber 31 situated at the bottom in the closed container 1 and a slewing shaft 3e, which is integrated with the slewing scroll member 3 and is situated under the slewing scroll member 3.

A motor 17 is situated under the slewing shaft 3e and is composed of a rotating shaft 8, whose bottom is inserted into an oil chamber 5, for driving the slewing scroll member 3, a rotor 15, a stator 16, a coil 18, etc. Also, an oil-feed hole 8a, that is, a lubrication fluid-guiding path, is formed so as to penetrate the shaft 8 along the axis line of the shaft 8, and a baffle plate 41 of annular shape is situated at the bottom portion of the shaft 8, whose periphery is fixed to the inner wall of the closed container 1, an oil-return hole 42 being formed at the periphery thereof.

As will be described later, at least three lubricating fluid pumps 101, 102, and 103 are provided at the rotating shaft 8, and each lubricating fluid pump feeds lubricating fluid to the nearest sliding portion. The capacity of each pump is designed so that the head of the pump is necessarily low to ensure a head to the next pump.

A scroll lap and an Oldham-key-groove are provided at the top face of the end plate of the slewing scroll member 3, and a thrust face and the slewing shaft 3e are provided at the bottom face of the end plate. Also, a scroll lap and a rotation stopper are provided at the bottom face of the end plate of the non-slewing scroll member 2. Further, a discharge hole 2*d* is opened. One or more grooves, which communicate with a discharge space via a hole 2*i*, are provided at the peripheral portion of the top face of the end plate, and an elastic ring seal 22, whose cross-section is of a horseshoe shape, is inserted into each groove.

A back flow-stop valve 24 is provided at the upper portion of the discharge hole 2*d* of the above-described non-slewing scroll member 2. This valve 24 serves as a bypass valve for preventing over-compression and fluid-compression, as a check valve for preventing reverse slew of the stewing scroll member 3 generated at the time of stopping of the compressor, and as a discharge valve for preventing under compression.

A non-slewing side projection part is provided on one face of the Oldham-ring 5, and a stewing side projection part is provided on the other face of the ring 5.

A cylindrical non-slewing holder 6 projects toward the center hole to support the non-slewing scroll member 2. Two radial grooves are provided symmetrically with regard to the central axis, which serve as a rotation stopper of the non-slewing scroll member 2, and an Oldham-key-groove is provided in which the non-slewing side projection part of the Oldham-ring 5 slides.

The non-slewing holder 6 is attached onto the peripheral portion of the top face of a frame 5, and a thrust bearing 4*a* is situated on the inner region of the top face of the frame 5. Further, one or more suction inlets 4*e*, which penetrate the frame 4 in the axial direction, are formed in the frame 14 for passing the sucked gas. It is also possible to provide these suction inlets 4*e* by forming notches on the peripheral side face of the frame 4 or in the non-slewing holder 6. Furthermore, the primary bearing 4*d* is provided in the center portion of the frame 4. Moreover, an oil-exhaust path leads to the peripheral side face of the frame 4 from the gap between the primary bearing 4*d* and the thrust bearing 4*a*, and a back pressure valve 10 is situated at an intermediate place in this oil-exhaust path.

A shaft oil-feed hole 8*a* and a primary shaft-feed hole 8*b* are formed inside the rotating shaft 8. Further, a primary shaft portion 8*h* having an enlarged diameter, is provided at the upper portion of the shaft 8, and a slewing bearing 8*f* is provided at the primary shaft portion 8*h*. Furthermore, the slewing shaft 3*e* engages with the slewing bearing 8*f* to form a journal bearing. Moreover, an oil-feed spiral groove 8*j* is formed at the inside wall of the slewing bearing 8*f*, and the slewing bearing 8*f* with this oil-feed spiral groove 8*j* functions as a bearing and an oil-feed pump. Also, the primary shaft portion 8*h* engages with the primary bearing 4*d*, situated in the frame 4, to form a journal bearing. In addition, an oil-feed spiral groove 8*i*, whose start point is the outlet of the primary bearing oil-feed hole 8*b*, is formed at the outside wall of the primary shaft portion 8*h*. Thus, the primary bearing 4*d* functions as a bearing and an oil-feed pump.

Here, the motor 17 is composed of a rotor 15 and a stator 16, and a stator groove 16*a* is formed at the peripheral side face of the stator 16 for letting oil drop down into the bottom space of the case of the motor 17.

The secondary bearing 9, which is one of the sliding portions, includes an oil groove 9*a* formed at the outside surface of the shaft 8, a cylindrical bearing bush 9*b*, and an end face-sealing member 9*c*. This oil groove 9*a* communicates with an oil-feed hole 9*d*, which leads to the oil-storage chamber 31 (lubricating fluid-storing chamber), at the front edge in the rotating direction of the shaft 8, and it communicates with the shaft oil-feed hole 8*a* at the back edge in the rotating direction of the shaft. Further, this oil groove 9*a* sucks up oil to the secondary bearing 9 via the oil-feed path 9*d*, and it discharges the sucked oil to the shaft oil-feed hole 8*a*. This pumping action of the oil-feed path 9*f* is caused by the viscous force due to the relative speed generated between the oil groove 9*a* formed at the outside surface of the shaft 8 and the inside wall of the cylindrical bearing bush 9*b* in rotation of the shaft 8. That is, the oil-feed path 9*f* functions as a viscous pump. Moreover, the end face-sealing member 9*c* is provided so as to prevent the leaking of oil from the gap between the outside surface of the shaft 8 and the inside wall of the bearing bush 9*b*.

A hermetic terminal 13, a discharge pipe 25, and a suction pipe 24 are welded or brazed to the case 19, and the secondary bearing 9 is fixed to the bottom of the case 19.

As described above, the present invention provides a displacement type fluid machine including a mechanism for compressing or transferring operating fluid, or bringing out mechanical energy from operating fluid, a rotating shaft for driving the mechanism or bringing out power from the mechanism, at least two sliding portions for smoothing relative motion between the mechanism and the rotating shaft, and a lubricating fluid-storing chamber for storing lubricating fluid used to lubricate the sliding portions. The displacement type fluid machine has a first lubricating fluid pump for feeding lubricating fluid, which is provided at the rotating shaft and is immersed in the lubricating oil stored in the lubricating fluid-storing chamber, for feeding lubricating fluid to a first one of the two sliding portions via a lubricating fluid-guiding path formed at the rotating shaft; and a second lubricating fluid pump, which is provided at the rotating shaft, for raising the pressure of lubricating fluid fed via the lubricating fluid-guiding path by a predetermined pump head, and for feeding the lubricating fluid, which has been fed via the lubricating fluid-guiding path, to a second one of the two sliding portions.

In the above-described displacement type fluid machine, the first lubricating fluid pump consists of a groove portion composed of a groove formed at the outside surface of the rotating shaft in the rotating direction, and the inside wall of a bearing of the rotating shaft.

Further, the present invention provides a displacement type fluid machine including a mechanism for compressing or transferring operating fluid, or bringing out mechanical energy from operating fluid, a rotating shaft for driving the mechanism or bringing out power from the mechanism, at least three sliding portions for smoothing relative motion between the mechanism and the rotating shaft, and a lubricating fluid-storing chamber for storing lubricating fluid used to lubricate the sliding portions. The displacement type fluid machine has a first lubricating fluid pump for feeding lubricating-oil, which is provided at the rotating shaft and is immersed in the lubricating oil stored in the lubricating fluid-storing chamber, for feeding lubricating fluid to a first one of the two sliding portions via a lubricating fluid-guiding path formed at the rotating shaft; a second lubricating fluid pump, which is provided at the rotating shaft, for raising the pressure of lubricating fluid fed via the lubricating fluid-guiding path by a predetermined pump head, and feeding the lubricating fluid, which has been fed via the lubricating fluid-guiding path, to a second one of the two sliding portions; and a third lubricating fluid pump which is provided at or near the rotating shaft, for raising the pressure of lubricating fluid which has been fed via the lubricating fluid-guiding path by a predetermined pump head, and feeding the lubricating fluid, which has been fed via the lubricating fluid-guiding path, to a third one of the two sliding portions.

At first, the flow of compressed gas will be explained. The slewing scroll member 3 is swirled by rotating the motor 17 so as to rotate the shaft 8, while preventing autorotation of the slewing scroll member 3. The gas which has filled up the case 19 flows into a suction chamber 35 through the suction inlet 4e and is enclosed in a compression chamber 33. Further, the enclosed gas is compressed and discharged from the discharge hole 2d to the outside of the compressor. Also, since the pressure in the ring seal 22 becomes the discharge pressure due to the existence of the hole 2i, the non-slewing scroll member 2 is pressed toward the slewing scroll member 3. Moreover, since the gas at the discharge pressure is sealed by the ring seal 22, this discharge pressure is maintained everywhere in the case of the compressor.

The back flow-stop valve 24 is provided at the outlet of the discharge hole 2d. This back flow-stop valve 24 is positioned so as to be away from the conical face formed at the upper portion of the discharge hole 2d during the neutral operation. Accordingly, since the gas can flow out without pushing up the back flow-stop valve 24 in an overcompression or proper pressure ratio operation state, the discharge path resistance is small, and the back flow-stop valve 24 is operated by the force due to the back flow of the compressed gas in the under-compression operation so that it blocks up the discharge hole 2d. Therefore, in a compressor having the above-described structure, only when a discharge valve is necessary will the discharge valve function occur. Moreover, in the stop operation of the compressor also, since the back flow-stop valve 24 is operated by the force due to the back flow of the gas so that it blocks up the discharge hole 2d, it is possible to prevent the slewing scroll member 3 from reversely rotating.

Next, the flow of the lubricating oil will be explained. FIG. 2 and FIG. 3 show the mechanisms of the first sliding portion and the first lubricating fluid pump. The lubricating oil in the oil-storage tank 31 is soaked up to the secondary bearing 9 via an oil-feed path 9d provided at the bottom end of the shaft 8, and the lubricating oil which has been discharged from the secondary bearing 9 enters the shaft oil-feed hole 8a. Here, a small amount of the lubricating oil passes through the gap between the top face of the bearing bush 9b and the end surface of the shaft 8, and oil is fed to a shaft thrust surface 9e, which in turn seals up the end surface of the shaft 8.

At the secondary bearing 9, the lubricating oil enters an oil groove 9a from the oil-feed path 9d, and it receives the shearing stress due to the relative velocity caused by the outside surface of the shaft 8 and the inside surface of the bearing 9, which is situated outside the shaft 8. Consequently, the rotation of the shaft 8 accompanies the motion of the lubricating oil in the rotation direction, which is caused by the viscosity of the oil, and the oil is transferred into the oil groove 9a in the rotation direction. Since another end portion of the oil groove 9a communicates with the oil-feed hole 8a, the oil flows into the shaft oil-feed hole 8a, and the viscose pumping function of transferring the lubricating oil is implemented.

FIG. 4 shows the mechanisms of the second sliding portion and lubricating fluid pump, and the third sliding portion and lubricating fluid pump.

The lubricating oil which has entered the shaft oil-feed hole 8a rises in the shaft oil-feed hole 8a, and it is fed to the other sliding portions of the primary bearing 4d and the slewing bearing 8f. A part of this oil enters the primary oil-feed hole 8b and is fed to the primary bearing 4d. The amount of the oil fed to the primary bearing 4d is determined by the capacity of the pumping function performed by the oil-feed spiral groove 8i formed at the primary bearing portion 8h. Further, the oil-feed spiral groove 8j is also formed at the slewing bearing 8f, and the amount of the oil fed to the stewing bearing 8f is also determined by the capacity of the pumping function performed by the oil-feed spiral groove 8j.

A part of the lubricating oil fed to the slewing bearing 8f and primary bearing 4d lubricates the thrust bearing 4a, and the rest of the fed oil is expelled to the outside of the side face of the frame 4 from the back pressure valve 10. The expelled oil drops down on the inside wall of the cylindrical case 21. Further, this oil flows down through the outside grooves 16 of the stator and finally returns to the oil-storage chamber 31. The back pressure valve 10 is installed in order to keep the pressure under the slewing scroll member 3 (the back pressure) lower by a predetermined level than the pressure at the side face of the frame 4, that is, the suction pressure. Thus, the back pressure is slightly increased, and the thrust load at the thrust surface 3d can be reduced by the slightly increased back pressure. Further, the oil which has lubricated the thrust bearing 4a flows into the suction chamber 35. Furthermore, this oil is used to seal gaps in the compression chamber 33, and it is expelled to the outside along with the exhaust gas.

Here, the secondary bearing 9 has a structure which serves both as a bearing and an oil-feed pump, and it can work as the bearing at the bottom of the shaft 8 and the oil-pump. Thus, as shown in FIG. 3, by setting a rotational coordinate system which the direction of the load applied toward the secondary bearing 9 is 0 deg., and the rotational direction of the shaft 8 is positive, the oil groove 9a, that is, the groove portion, is formed, for example, in a range of 60 deg.–330 deg. If the oil groove 9a is formed in the above range, the pressing force generated by the load acting on the shaft 8 is applied in the range of 0 deg.–60 deg. or the range of 330 deg.–360 deg., where no oil groove is formed, and the bearing can support the load. Accordingly, the secondary bearing 9 can function as the bearing and the oil-pump. Therefore, although there has been conventionally a bearing power loss and an oil-feed pumping loss in a mechanical power loss, it has become apparent that only an oil-feed pumping loss should be taken into account, and this brings about an advantage of reducing one of the above two kinds of power losses. To top it all, the oil pump can be composed by only slightly modifying the structure of a bearing portion, and the power loss due to this oil pump is as low as that caused by only a bearing. Thus, it is possible to provide a displacement type fluid machine whose mechanical power loss is nearly equal to that of a displacement type fluid machine without an oil-feed pump.

Further, the slewing bearing 8f and the primary bearing 4d, as well as the secondary bearing 9, have a structure serving as both a bearing and an oil-feed pump, and they can function as the bearing at the bottom of the shaft 8 and the oil-pump. In these bearings 8f and 4d also, by setting the rotational coordinates in order that the direction in which the load is applied toward the bearings is 0 deg., and the rotational direction of the shaft 8 is positive, the respective oil grooves 8i and 8j are formed in a range of 60 deg.–330 deg. If the respective oil grooves 8i and 8j are formed in the above range, the pressing force generated by the load acting on the shaft 8, is applied in the range of 0 deg.–60 deg. or the range of 330 deg.–360 deg., where no oil groove is formed, and each bearing can support the load. Accordingly, each of the bearings 8i and 8j can function as a bearing and an oil-pump.

The capacity of oil-feed pumping performed by the secondary bearing 9 is set so that this pump can assure only a pump head from this bearing 9 to the slewing bearing 8f. That is, the oil-feed pump formed at the secondary bearing 9 works for the priming of lubricating oil to the oil-feed pump at the slewing bearing. The amount of oil fed to the primary bearing 4d and the slewing bearing 8f is determined by the pumping functions performed by the oil-feed spiral groove 8i and the oil-feed spiral groove 8j. As described above, by composing the oil-feed pump so that the lubricating oil is serially pushed up from the inside of the shaft oil-storage chamber to the primary bearing 4d and the slewing bearing 8f, each pump has only to work for the priming of lubricating oil to the next oil-feed pump, and the amount of lubricating oil which each bearing is assured by its own pumping operation and the screw pumping operation of the bearing. Thus, since each bearing can obtain the amount of necessary oil, and the capacity of each pump can be limited to only a pump head to the next pump, the pumping power loss can be remarkably reduced.

For example, if the pressure P which is to be generated by the first lubricating oil pump has a value of $(1.0-1.5)L\rho g$, where L: the height from this pump to the second or third lubricating oil pump, $\rho$: the density of the lubricating oil, and g: gravity, the necessary capacity of this pump can be sufficiently assured.

Further, since an nearly ideal oil-feeding performance can be obtained from a low speed range to a high speed range for bearings to which the present invention is applied, the following conventional problems can be solved, that is increase of power consumed by the over oil-feeding and the excess oil-compressing in a high speed range, and abrasion or seizure at sliding portions due to insufficient oil-feeding in a low speed range. By solving these conventional problems, the performance and the reliability of a displacement type fluid machine can be improved.

Furthermore, since an oil pump is formed at each bearing in a united structure so that the oil pump forms a part of the bearing, power loss of the oil pump, which has been a problem in a conventional displacement type fluid machine, can be nearly extinguished, and there is approximately only a power loss due to bearing actions, which in turn also improves the performance of a displacement type of fluid machine.

In addition, since the structure of a lubricating oil pump according to the present invention is simple, and the number of parts which make up the oil pump incorporated in each bearing is small, the fabricating of the oil pump becomes easy, and this makes it possible to provide a cheaper and highly reliable displacement type fluid machine.

In the above embodiments, although a viscous pump is applied to the secondary bearing, and a screw pump is applied to each of the primary and the slewing bearing, other types of non-displacement pumps can be used for the respective bearing, which can bring about similar effects. That is, although it is necessary that an oil-feed path from an oil-storage chamber for storing lubrication oil to respective bearings is always formed in order to feed lubricating oil to each bearing by using its own pumping function, the same composition can also be achieved even if centrifugal pumps are used.

As described above, the present invention provides a displacement type fluid machine, including a mechanism for compressing or transferring operating fluid, or bringing out mechanical energy from operating fluid, a rotating shaft for driving the mechanism or bringing out power from the mechanism, at least two sliding portions for smoothing relative motion between the mechanism and the rotating shaft, and a lubricating fluid-storing chamber for storing lubricating fluid used to lubricate the sliding portions. The displacement type fluid machine has lubricating fluid pumps, provided at respective sliding portions of the rotating shaft, for feeding lubricating fluid to the respective sliding portions; wherein, a first pump of the lubricating fluid pumps, which is immersed in the lubricating oil stored in the lubricating fluid-storing chamber, generates such pressure $P=(1.0 \text{ to } 1.5) L\rho g$ as can sufficiently assure a pump head to a next lubricating fluid pump, where L: the height to the next lubricating fluid, $\rho$: the density of the lubricating oil, and g: gravity.

In the above displacement type fluid machine, a pump head from the second lubricating fluid to a second sliding portion is generated by the second pump, and the pump head generated by the second pump is independent of the pump head generated by the first pump.

Figure 5:
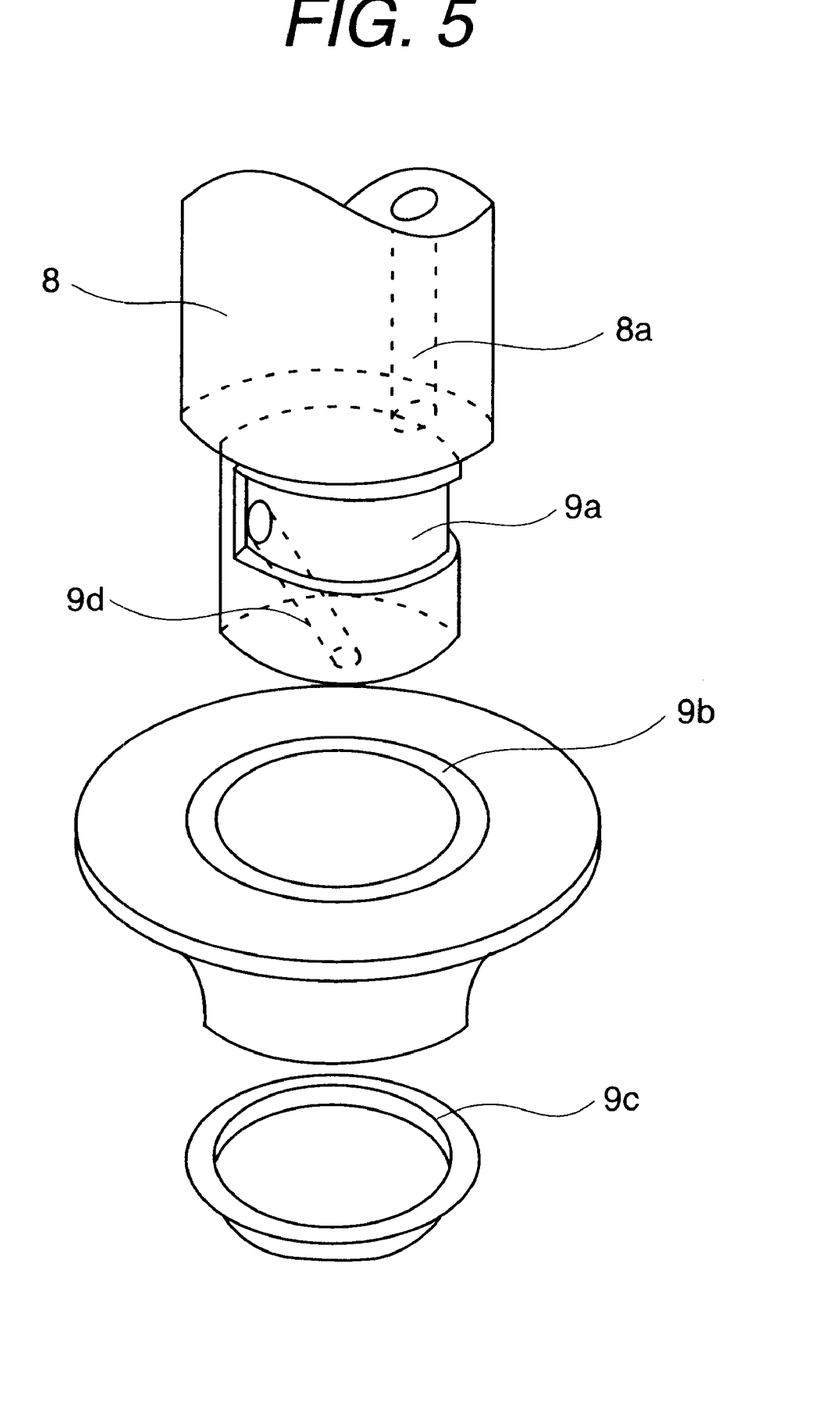
FIG. 5 is an exploded perspective view of a secondary bearing portion representing another embodiment according to the present invention.

Next, another embodiment will be explained with reference to FIG. 5. The fundamental composition and operations of a compressor according to this embodiment is the same as those of the scroll compressor shown in FIG. 1, and FIG. 5 shows an exploded perspective view of the secondary bearing portion. In this embodiment, an oil-feed path 9d communicating with the oil groove 9a is formed as a hole which is led from the inside center of the shaft 8 to the outside surface of the shaft 8. By the above structure, the oil-feed path itself functions as a centrifugal pump, and the soaking-up of lubricating oil to the secondary bearing 9 can be reliably performed. Here, the pumping capacity of this oil-feed path has only to generate a pump head to the secondary bearing 9. That is, this oil-feed path 9d is used only as a mechanism for priming lubricating oil to the secondary bearing. This priming function is necessary if a head from an oil-storage chamber to a secondary bearing is large, or a head between bearings is large, and the feeding of oil to the bearings becomes certain by this priming function. In this embodiment, although the centrifugal pump is provided before the secondary bearing, it is possible to provide a plurality of centrifugal pumps between neighboring bearings.

In the above embodiments, the present invention has been described by taking a closed low-pressure chamber type scroll compressor as an example. However, even if the present invention is also applied to a displacement type fluid machine, such as a high-pressure chamber type scroll compressor, a compressor of a type other than a scroll type, a pump, an expansion machine, etc., the same advantages as those of the above embodiments can be obtained. Moreover, even if no oil, but working fluid itself, is used as a lubricating fluid, the same advantages can be brought out.

In accordance with the present invention, to say nothing of each pump head between bearings, the sum of total pump heads between bearings is smaller than the head necessary in a single pump method, which in turn can make it possible to provide a high-performance, highly-reliable, and low-cost displacement type fluid machine.

What is claimed is:
1. A displacement fluid machine including a mechanism for compressing or transferring working fluid, or bringing out mechanical energy from working fluid, a rotating shaft for driving said mechanism or bringing out power from said mechanism, at least two sliding portions for smoothing relative motion between said mechanism and said rotating shaft, and a lubricating fluid-storing chamber for storing lubricating fluid used to lubricate said sliding portions, said displacement fluid machine comprising:

a first lubricating fluid pump provided at said rotating shaft and immersed in said lubricating oil stored in said lubricating fluid-storing chamber, said first lubricating fluid pump feeding lubricating fluid to a first one of said two sliding portions and feeding lubricating fluid to a lubricating fluid-guiding path provided in said rotating shaft; and a second lubricating fluid pump which is provided at said rotating shaft, for raising the pressure of lubricating fluid which has been fed via said lubricating fluid-guiding path by a predetermined pump head, and feeding said lubricating fluid, which has been fed via said lubricating fluid-guiding path, to a second one of said two sliding portions; and wherein said first lubricating fluid pump includes a groove portion composed of a groove formed at the outside surface of said rotating shaft in the rotating direction of said rotating shaft, and the inside wall of a bearing of said rotating shaft.

2. A displacement fluid machine according to claim 1, wherein, setting a rotational coordinate system such as that in which the direction of a load applied toward said bearing is 0 deg., and the rotational direction of said shaft is positive, said groove portion is formed in a range of 30 deg.–330 deg.

3. A displacement fluid machine according to claim 1, wherein said first lubricating fluid pump is a non-displacement type pump which is typified by centrifugal pump and a viscous pump.

4. A displacement fluid machine according to claim 1, wherein said second lubricating fluid pump is a spiral groove pump including a spiral groove portion composed of a spiral groove formed at said shaft and the inside wall of said slewing bearing.

5. A displacement fluid machine according to claim 1, wherein said second lubricating fluid pump is a spiral groove pump including a spiral groove portion composed of a spiral groove formed at a slewing bearing of said shaft and the inside wall of said slewing bearing.

6. A displacement fluid machine including a mechanism for compressing or transferring working fluid, or bringing out mechanical energy from working fluid, a rotating shaft for driving said mechanism or bringing out power from said mechanism, at least two sliding portions for smoothing relative motion between said mechanism and said rotating shaft, and a lubricating fluid-storing chamber for storing lubricating fluid used to lubricate said sliding portions, said displacement fluid machine comprising:

lubricating fluid pumps provided at respective sliding portions of said rotating shaft, for feeding lubricating fluid to said respective corresponding sliding portions;

wherein a first one of said lubricating fluid pumps, which is immersed in said lubricating fluid stored in said lubricating fluid-storing chamber, generates pressure P=(1.0 to 1.5) Lρg sufficient to assure a pump head to a next lubricating fluid pump, where L: the height to the next lubricating fluid, ρ: the density of said lubricating fluid, and g: gravity; and wherein said first lubricating fluid pump includes a groove portion composed of a groove formed at the outside surface of said rotating shaft in the rotating direction of said rotating shaft, and the inside wall of a bearing of said rotating shaft.

7. A displacement fluid machine according to claim 6, wherein a pump head from said second lubricating fluid to a second sliding portion is generated by said second pump, and said pump head generated by said second pump is independent of the pump head generated by said first pump.

8. A displacement fluid machine including a mechanism for compressing or transferring operating fluid, or bringing out mechanical energy from working fluid, a rotating shaft for driving said mechanism or bringing out power from said mechanism, at least three sliding portions for smoothing relative motion between said mechanism and said rotating shaft, and a lubricating fluid-storing chamber for storing lubricating fluid used to lubricate said sliding portions, said displacement fluid machine comprising:

a first lubricating fluid pump provided at said rotating shaft and immersed in said lubricating fluid stored in said lubricating fluid-storing chamber, said first lubricating fluid pump feeding lubricating fluid to a first one of said two sliding portions and feeding lubricating fluid to a lubricating fluid-guiding path provided in said rotating shaft;

a second lubricating fluid pump, which is provided at said rotating shaft, for raising the pressure of lubricating fluid which has been fed via said lubricating fluid-guiding path by a predetermined pump head, and feeding said lubricating fluid, which has been fed via said lubricating fluid-guiding path, to a second one of the two sliding portions; and a third lubricating fluid pump, which is provided at or near said rotating shaft, for raising the pressure of lubricating fluid which has been fed via said lubricating fluid-guiding path by a predetermined pump head, and feeding said lubricating fluid, which has been fed via said lubricating fluid-guiding path, to a third one of said two sliding portions; and wherein said first lubricating fluid pump includes a groove portion composed of a groove formed at the outside surface of said rotating shaft in the rotating direction of said rotating shaft, and the inside wall of a bearing of said rotating shaft.

9. A displacement fluid machine according to claim 8, each of said lubricating fluid pumps is a non-displacement type pump formed at a part of a bearing portion corresponding to said pump.

10. A displacement fluid machine including a mechanism for compressing working fluid, a rotating shaft for driving said mechanism, at least two sliding portions for smoothing relative motion between said mechanism and said rotating shaft, and a lubricating fluid-storing chamber for storing lubricating fluid used to lubricate said sliding portions, said displacement fluid machine comprising:

a first lubricating fluid pump provided at said rotating shaft and immersed in said lubricating oil stored in said lubricating fluid-storing chamber, said first lubricating fluid pump feeding lubricating fluid to a first one of said two sliding portions and feeding lubricating fluid to a lubricating fluid-guiding path provided in said rotating shaft; and a second lubricating fluid pump which is provided at said rotating shaft, for raising the pressure of lubricating fluid which has been fed via said lubricating fluid-guiding path by a predetermined pump head, and feeding said lubricating fluid, which has been fed via said lubricating fluid-guiding path, to a second one of said two sliding portions; and wherein said first lubricating fluid pump includes a groove portion composed of a groove formed at the outside surface of said rotating shaft in the rotating direction of said rotating shaft, and the inside wall of a bearing of said rotating shaft.

11. A displacement fluid machine according to claim 10, wherein, setting a rotational coordinate system such as that in which the direction of a load applied toward said bearing is 0 deg., and the rotational direction of said shaft is positive, said groove portion is formed in a range of 30 deg.–330 deg.

12. A displacement fluid machine according to claim 10, wherein said first lubricating fluid pump is a non-displacement pump which is typified by centrifugal pump and a viscous pump.

13. A displacement fluid machine according to claim 10, wherein said second lubricating fluid pump is a spiral groove pump including a spiral groove portion composed of a spiral groove formed at said shaft and the inside wall of said slewing bearing.

14. A displacement fluid machine according to claim 10, wherein said second lubricating fluid pump is a spiral groove pump including a spiral groove portion composed of a spiral groove formed at a slewing bearing of said shaft and the inside wall of said slewing bearing.

15. A displacement fluid machine including a mechanism for compressing working fluid, a rotating shaft for driving said mechanism, at least two sliding portions for smoothing relative motion between said mechanism and said rotating shaft, and a lubricating fluid-storing chamber for storing lubricating fluid used to lubricate said sliding portions, said displacement fluid machine comprising; and wherein said first lubricating fluid pump includes a groove portion composed of a groove formed at the outside surface of said rotating shaft in the rotating direction of said rotating shaft, and the inside wall of a bearing of said rotating shaft.

lubricating fluid pumps provided at respective sliding portions of said rotating shaft, for feeding lubricating fluid to said respective corresponding sliding portions;

wherein a first one of said lubricating fluid pumps, which is immersed in said lubricating fluid stored in said lubricating fluid-storing chamber, generates pressure $P=(1.0 \text{ to } 1.5) L\rho g$ sufficient to assure a pump head to a next lubricating fluid pump, where L: the height to the next lubricating fluid, $\rho$: the density of said lubricating fluid, and g: gravity;

16. A displacement fluid machine according to claim 15, wherein a pump head from said second lubricating fluid to a second sliding portion is generated by said second pump, and said pump head generated by said second pump is independent of the pump head generated by said first pump.

17. A displacement fluid machine including a mechanism for compressing a working fluid, a rotating shaft for driving said mechanism, at least three sliding portions for smoothing relative motion between said mechanism and said rotating shaft, and a lubricating fluid-storing chamber for storing lubricating fluid used to lubricate said sliding portions, said displacement fluid machine comprising:

a first lubricating fluid pump provided at said rotating shaft and immersed in said lubricating fluid stored in said lubricating fluid-storing chamber, said first lubricating fluid pump feeding lubricating fluid to a first one of said two sliding portions and feeding lubricating fluid to a lubricating fluid-guiding path provided in said rotating shaft;

a second lubricating fluid pump, which is provided at said rotating shaft, for raising the pressure of lubricating fluid which has been fed via said lubricating fluid-guiding path by a predetermined pump head, and feeding said lubricating fluid, which has been fed via said lubricating fluid-guiding path, to a second one of the two sliding portions; and a third lubricating fluid pump, which is provided at or near said rotating shaft, for raising the pressure of lubricating fluid which has been fed via said lubricating fluid-guiding path by a predetermined pump head, and feeding said lubricating fluid, which has been fed via said lubricating fluid-guiding path, to a third one of said two sliding portions; and wherein said first lubricating fluid pump includes a groove portion composed of a groove formed at the outside surface of said rotating shaft in the rotating direction of said rotating shaft, and the inside wall of a bearing of said rotating shaft.

18. A displacement fluid machine according to claim 17, each of said lubricating fluid pumps is a non-displacement pump formed at a part of a bearing portion corresponding to said pump.

* * * * *